United States Patent

[11] 3,543,685

[72] Inventor Jan J. Rosciszewski
4784 Panaroma Drive, San Diego, California 92117
[21] Appl. No. 729,669
[22] Filed May 16, 1968
[45] Patented Dec. 1, 1970

[54] GROUND ORIENTED VEHICLE WITH REACTION TYPE PROPULSION
13 Claims, 5 Drawing Figs.

[52] U.S. Cl. .................................................. 104/23, 104/156
[51] Int. Cl. .................................................. B61b 13/08, B61b 13/12
[50] Field of Search............................................ 104/156, 155, 138, 139, 140, 23(F.S.); 105/63, 64, 65, 66

[56] References Cited
UNITED STATES PATENTS
376,429   1/1888   Creighton.................... 104/139
FOREIGN PATENTS
118,415   3/1901   Germany.................... 104/156
913,736   12/1962  Great Britain................ 104/138

Primary Examiner—Joseph R. Leclair
Assistant Examiner—James R. Garrett
Attorney—Carl R. Brown ABSTRACT: A ground-oriented vehicle that may be supported by an air cushion or on a rail that is propelled by reaction-type propulsion, such as a fan jet engine, with the reaction-type propulsion unit being mounted in a tube to reduce the transmission of propulsion unit noise to the outer atmosphere.

Patented Dec. 1, 1970 3,543,685

INVENTOR.
JAN J. ROSCISZEWSKI
BY
ATTORNEY

INVENTOR.
JAN J. ROSCISZEWSKI
BY

ATTORNEY 3,543,685

GROUND ORIENTED VEHICLE WITH REACTION TYPE PROPULSION

BACKGROUND OF THE INVENTION

Ground-oriented vehicles for carrying passengers along established routes, such as trains, subway vehicles, monorail vehicles, and the like, employ many different types of propulsion systems. These propulsion systems may comprise diesel engines, electromotive propulsion systems, linear electric motor units and the like. These propulsion systems normally turn drive wheels on the vehicle that propels the vehicle through traction with a supporting rail. To assure sufficient force transmitting traction, the vehicle normally must be heavy. Thus considerably power is required to move the vehicle up to speed and condiderable braking force is required to stop the moving vehicle. While lightweight transportation vehicles of this type have been considered, because of the reduced cost in manufacturing and power requirements, the traction required between the vehicle and the rails has been a limiting factor. Further, as vehicle bodies are made lighter and are moved faster, the lightweight vehicle becomes partially airborne further reducing the traction between the drive wheels and the supporting rails.

The propelling units or engines on existing transportation vehicles are relatively expensive and often have a high cost per power unit ratio. Further, such engines require considerable maintenance to maintain in operating condition, and since the engines are integrated with the vehicle traction driving unit, the entire vehicle is often out of operation while engine repair work is performed. The use of traction driving of such vehicles places a difficult limitation in reducing noise, vibrations and the like between the rails and the vehicle passenger compartment.

Accordingly, it is difficult to provide and propel a light and relatively inexpensive vehicle in high speed transporting of persons over a given track. Thus it would be advantageous to have a lightweight vehicle for transporting passengers at high speeds on a given ground-oriented track that employs a relatively inexpensive aircraft propulsion system, which propulsion system eliminates traction drive and is quickly and easily removed from the vehicle for repair and overhaul.

SUMMARY OF THE INVENTION

In embodiments of my invention, a vehicle for carrying passengers is supported in one embodiment by air cushion means on a relatively flat track surface. An in another embodiment the vehicle is supported on a single rail and has no traction driving unit. The vehicle is propelled by a reaction type propulsion unit that may be of aircraft design, such as a fan jet engine, that is connected to the vehicle by a strut and pod arrangement. The fan jet engine rides in a tube that is positioned either at the side, below, or in some orientation with the track on which the vehicle moves. The vehicle itself may have an aircraft construction and be relatively lightweight.

In the air cushion supported embodiment, air fan units of known design inject air volumes between the vehicle and the track and thus support the vehicle at given spaced distance from a track. The jet engine or reaction propulsion unit is positioned in a channel or tube underneath the track and is connected to the vehicle by struts that pass through a longitudinal slot in the tube. Sound deadening or suppressing configurations in the slot restrict the passage of sound waves therethrough. Accordingly, the vehicle rides on an air cushion allowing substantially frictionless movement at high speeds and employs a known propulsion unit having considerable power that may be quickly and easily repaired or overhauled by merely disconnecting it in the known manner from the supporting strut. Air brakes are provided for reducing or stopping the vehicle in its movement, also the reaction-type engine is provided with known thrust reversers for reducing the momentum of the vehicle in the known manner.

In another embodiment of my invention, the vehicle rides on a single rail and is propelled by a reaction-type propulsion unit in the manner previously described. Since the propulsion is not provided through frictional contact of the supporting wheels with the rail, the wheels may be suspended in a manner to reduce vibrations passing to the passenger vehicle. Further means are provided for spraying oil to the point of contact of the wheels with the rail to reduce friction, wear, heating and fatigue and provide a shock absorbing oil film therebetween that provides a smooth ride.

The tube that contains the reaction-type engine or fan jet engine has means for exhausting air to and from the atmosphere to provide sufficient oxygen for supporting combustion in the jet engine. Also means such as a charcoal lining, is provided in the tube to remove combustion contaminates from the air that passes into the atmosphere.

It is therefore an object of this invention to provide a new and improved vehicle for moving at high speeds on a given track or road bed.

It is another object of this invention to provide a new and improved ground-oriented vehicle with reaction type propulsion.

It is another object of this invention to provide a new and improved ground-oriented vehicle with a conventional jet engine propulsion unit that reduces or substantially eliminates the jet engine noise in the atmosphere surrounding the vehicle.

It is another object of this invention to provide a new and improved ground-oriented vehicle that utilizes well developed jet propulsion technology to provide high-speed ground transportation without creating excessive noise.

It is another object of this invention to provide a new and improved ground-oriented vehicle with reaction-type propulsion that has a reduced friction resistance in its passage along the supporting track.

It is another object of this invention to provide a new and improved ground-oriented vehicle that is light weight, is inexpensive to construct, that may be propelled at a high speed.

It is another object of this invention to provide a new and improved ground-oriented vehicle that may safely employ an atomic-type propulsion engine.

It is another object of this invention to provide a new and improved air cushioned supported, ground-oriented vehicle with a reaction-type propulsion engine.

Other objects and many advantages of my invention will become more apparent upon a reading of the following description in which like parts are designated by like reference numerals throughout and in which.

Figure 1:
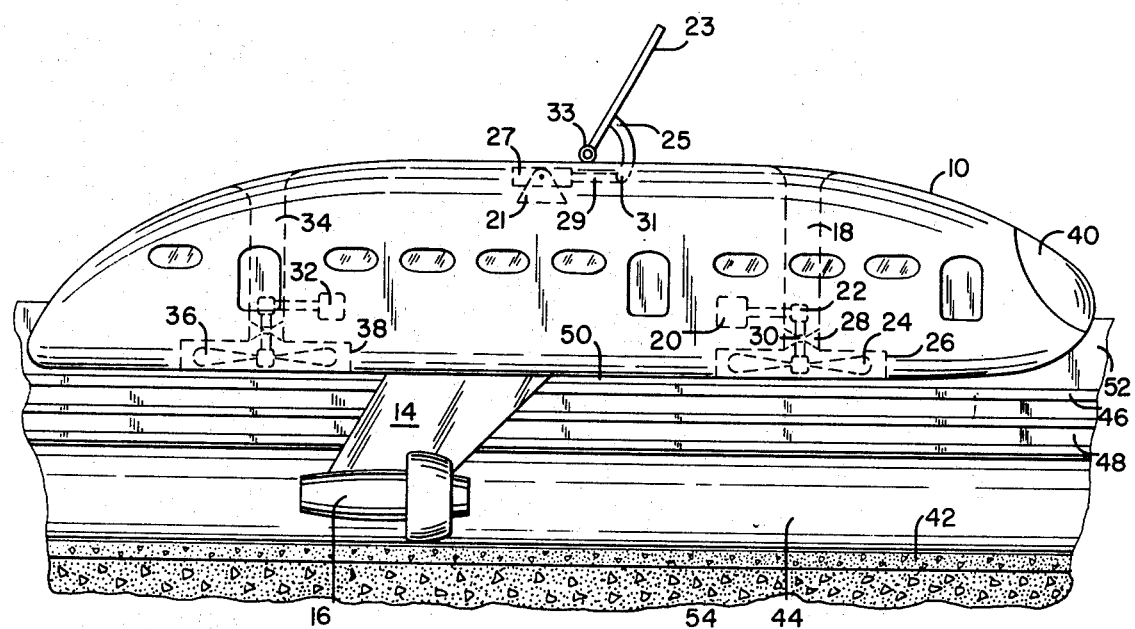
FIG. 1 is a side elevational view with parts broken away of an embodiment of the ground oriented, air cushioned supported vehicle with a fan jet engine as the propelling means.
Figure 2:
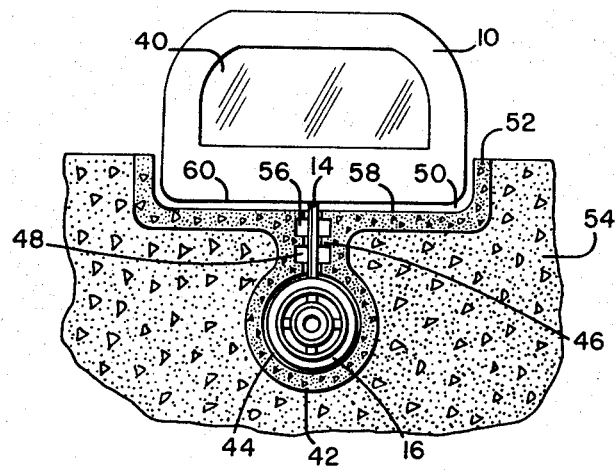
FIG. 2 is an end view of the air cushioned supported vehicle of FIG. 1 with the supporting track and tube in cross section.

Referring now to FIGS. 1 and 2, a passenger vehicle 10 may be of aircraft design and has compartments for carrying passengers such as in trains, aircraft, subway vehicles and the like. A forward window 40 provides observation to the passengers or driver in the vehicle 10. The vehicle 10 has a relatively flat lower surface 60 that conforms to a flat surfaced road bed 58 having side members 52. The vehicle 10 has fore and aft fan units 24 and 36 of known design that draw air through respective conduits 18 and 34. The forward fan unit 24 has a motor 20 that through a drive mechanism 22, having support members 28 and bearing 30, turns the fan unit 24 causing air to be forced downwardly out an opening in the bottom of the vehicle 10. A motor unit 32 drives a similar fan unit 36 that draws air through conduit 34 and forces the air in volumes and under pressure through opening 38 through the lower portion of the vehicle 10. This air under pressure forms a supporting air cushion in the known manner for supporting the vehicle a spaced distance 50 above the surface of the road bed 58. A cylindrical tube 42 is positioned under the center of the flat surface of the road bed 58 and has a volume 44 for receiving a jet engine 16. The jet engine 16 is connected to the lower surface of the vehicle 10 by a connecting strut 14. The tube 42 extends along the complete length of the road bed 58 and has a longitudinal slot 56 that extends full length of the tube 42. The strut 14 moves in this opening 56. A plurality of longitudinal grooves or projections 46 and 48 in the slot 56 provide means for suppressing the passage of sound waves created by operation of the fan jet engine from passing through the slot 56 to the outer atmosphere along the road bed and into the passenger compartment of the vehicle 10.

The road bed 58 and tube 42 may be constructed of high density and high strength concrete or of other suitable materials. The road bed 52 and tube 42 may be supported in the ground or in any other suitable material and preferably would be supported in a base structure 54 of concrete.

Since there is no basic frictional traction between the vehicle 10 and the road bed 58, an air drag plate 23, that in the operational position projects into the air passing over the upper surface of the vehicle 10, functions to stop movement of the vehicle. The drag plate 23 is pivotally connected by a known hinge connection 33 to the upper surface of the vehicle 10. An arm 25 is connected to a hydraulic motor 27 by a connecting rod 29 that is pivotally connected at 31 to the arm 25. A support 21 secures the hydraulic motor 27 to the vehicle structure 10 and allows the hydraulic unit 27 to pivot relative to support 21 in the manner to raise and lower the drag plate 23.

In operation of the first embodiment, the fan units 24 and 36 are operated to inject volumes of air under pressure in the space between the vehicle 10 and the surface of the road bed 58 raising the vehicle 10 a given predetermined distance above the surface. The fan jet engine 16 is energized moving the vehicle on the road bed 58. It should be recognized that the volume of air under pressure provided by fan unit 36 is normally greater than that provided by fan unit 24 inasmuch as the propulsion unit 16 tends to cause a counter clockwise rotational movement of the vehicle 10.

When it is desired to stop or decrease the momentum of speed of the vehicle 10, the drag plate 23 is raised and the known thrust reverser of the jet engine 16 is operated in the known manner to cause reverse thrust to be applied to the vehicle in the volume 44 of the tube 42. The vehicle thus comes to a stop in the manner of braking and stopping aircraft. It may be observed that when it is necessary to repair or overhaul the fan jet engine 16, the engine may be removed by merely uncoupling it from the strut 14 and passing it through an enlarged opening (not shown) in the slot 56. Another jet engine is then secured to the strut and the vehicle is again operational.

Figure 3:
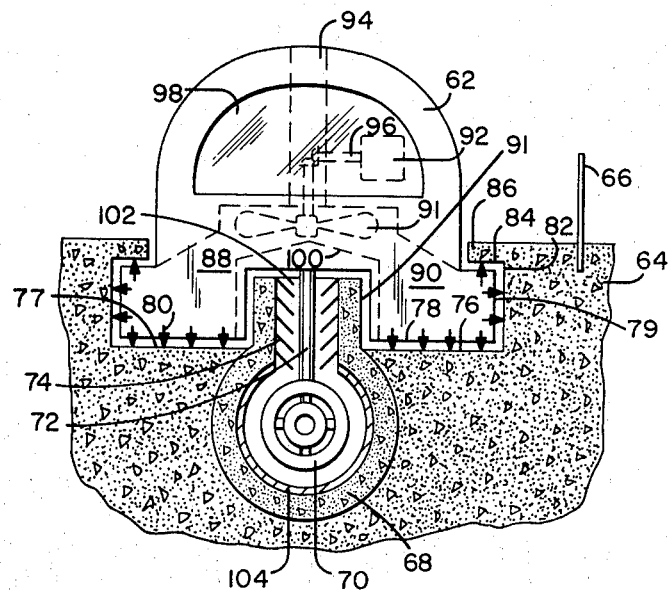
FIG. 3 is an end view illustrating a modified air cushioned supported vehicle with a modified track structure, the latter of which is illustrated in cross section.

Referring now to FIG. 3, a vehicle 62 and road bed 64 has a modified construction from that illustrated in FIG. 1. The road bed 64 has a raised center portion 91 with a slot 102 that connects with the volume of the tube 68. In this embodiment longitudinal vanes 78, that may be made of any suitable material, projects inwardly and are inclined downwardly to suppress the passage of sound waves out through the slot 102. The jet engine 70 is connected to the lower portion of the vehicle 62 by a strut 72 in the manner previously described relative to FIGS. 1 and 2. The road bed has a pair of flat surfaces 76 and 77 on each side of the raised center portion 91. Each side flat surface has a side surface 82 with an inwardly directed shoulder 86 forming an upper overhanging surface 84. The vehicle 62 has side portions 88 and 90 with a configuration that corresponds to the shape and configuration of the road bed structure 64.

An air fan unit 91, that is propelled by a known motor 92 and power linkage 96, draws air through a conduit 94 and directs the air volume under pressure out appropriate conduits in the side portions 88 and 90. This air pressure as illustrated by arrows 80 provide a supporting force on the lower surfaces 78 and side surfaces 79 of the side portions of the vehicle 62 to maintain its orientation on an air cushion support within the channels of the road bed 64. This air cushion pressure also coacts against the surfaces 84 of the overhanging portions 86 to restrain the upward movement of the vehicle 62. Thus the vehicle is held in the position illustrated for substantially frictionless and air cushion supported movement on the road bed 64. A fence 66 may be employed in the road bed 64 for further suppressing noise that may be created by the movement of the vehicle 62. The fence 66 may have any desired height and be constructed of known sound deadening material.

In operation of the embodiment illustrated in FIG. 3, the fan unit 91 provides air volume under pressure to support the vehicle in the position illustrated in FIG. 3 and the fan jet propulsion unit 70 or other reaction-type propulsion units provide the force to move the vehicle along the road bed 64.

Figure 4:
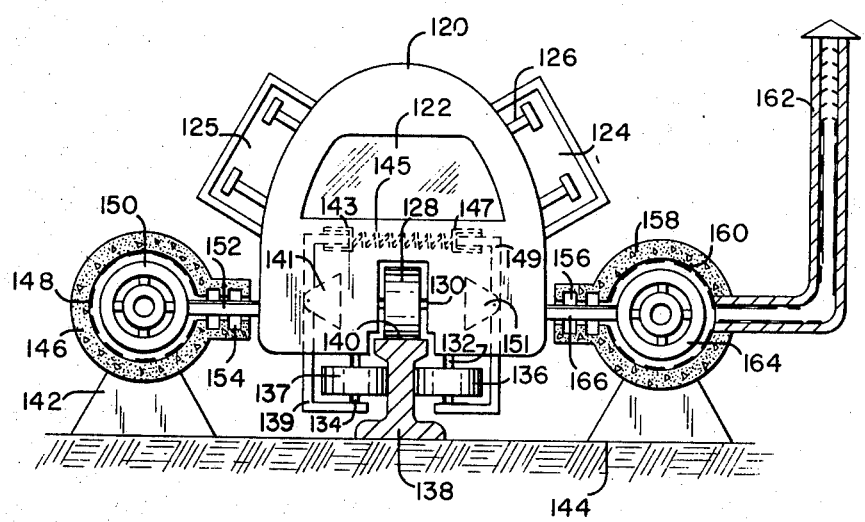
FIG. 4 is an end view of a ground oriented vehicle supported on a single rail and having side positioned tubes illustrated in cross section for containing jet-type propulsion engines.

The volume in the tubes 42 and 68 is supplied with air through the respective slots 56 and 102 and, if necessary, from a suitable air pump (not shown). The air may exhaust out of a chimney 162 as illustrated in FIG. 4. It is necessary to provide sufficient air and oxygen in the tubes to allow combustion in the fan jet engine. While it is advantageous to employ the well developed jet propulsion technology to high-speed ground transportation, it should be recognized that other types of reaction-type propulsion systems may be employed in this invention, such as nuclear-type reaction propulsion engines. Radiation shield material 104 is inserted in the engine tube 68 where a nuclear reaction propulsion engine is used.

Referring now to FIG. 4, a vehicle 120 having a forward observation window 122 is supported on a single rail 138 that is in turn supported on a road bed 144 in the known manner. Alinement and supporting wheels 128, 136 and 137 contact the upper and side surfaces of the rail 138. Wheels 128 are supported on axles 130, side wheels 136 are supported on axles 132 and side wheels 137 are supported on axles 134. The axles 134 and 132 are supported by frame units 139 and 149 that are pivotally supported by supports 141 and 151. Spring 145 is secured at its ends to sleeves 143 and 147, the combination of which biases the frame units 139 and 149 around the pivot points, resiliently forcing wheels 137 and 136 against the sides of the single rail 138, maintaining stability against sidesway and a constant gripping force between the guiding wheels and the rail. The side wheels 136, 137 and the center wheel 128 do not provide any traction-type propulsion, and accordingly these wheels merely provide for rolling of the vehicle 120 and support of the vehicle both vertically and against side movement and sway.

The vehicle 120 is propelled by reaction type engines 150 and 164 that are positioned in tubes 146 and 158. The tubes 146 and 158 are supported on piers 142 that are in turn supported on the upper surface of the road bed 144 in any known manner. The engine 150 is connected to the vehicle 120 by a strut 152 through a slot having a sound suppressing configuration 154. The engine 164 is connected to the vehicle 120 by a strut 166 that moves in a side longitudinal slot having sound suppressing means 156. Each of the tubes 146 and 158 may be constructed of high density concrete or other suitable materials. A chimney 162 provides for free flow of air out of the volume of the tube 158 and a similar chimney may be provided for the tube 146. Drag plates 124 and 125 are moved to the projected position by linkages 126 in a known manner such as is illustrated in FIG. 1.

In operation, the vehicle 120 rolls on the wheels 128, 136 and 137 on the rail 138. The reaction propulsion units that are fan jet engines 150 and 164, propel the vehicle 120 with a balanced propulsion in the manner previously described. The drag plates 124 and 125 are pivoted outwardly and coact with the normal thrust reverser construction in the jet engines 150 and 164 to provide braking of the vehicle.

Figure 5:
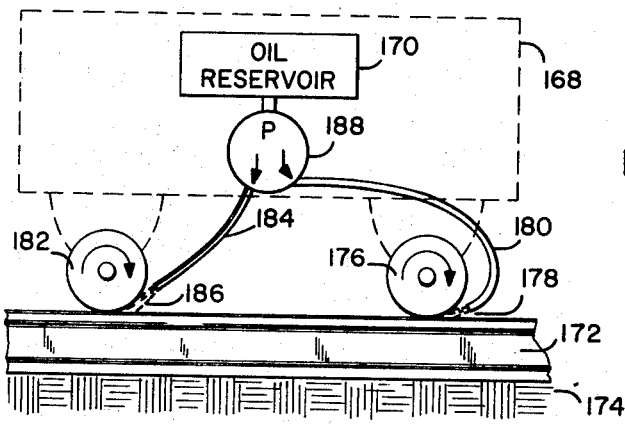
FIG. 5 is a schematic illustration of means mounted on the ground-oriented vehicle of FIG. 4 for supplying oil to the wheels in moving over the supporting rail.

In the vehicle structure of FIG. 4, an oil reservoir 170, see FIG. 5, is positioned on the vehicle 120 by any suitable connecting box 168. A pump unit 188 provides oil under pressure through lines 180 and 184 that eject or spray the oil 178 and 186 to the point of contact between the surface of the rail 172 and the turning wheels 176 and 182. The rail 172 is positioned on a base support 174. While only vertical wheels 176 and 182 are illustrated in FIG. 5, it may be understood that these wheels correspond to wheels, for example wheels 128, 136 and 137 in FIG. 4. The oil spray provides a lubricated rail wheel contact, as for example on the surface 140 of FIG. 4, with a film thickness that may be as thin as 10 microns. This oil film functions to reduce wear, heating, and fatigue and provides a smooth ride.

Thus the present invention makes possible the application of the fan jet engine to propelling a high-speed vehicle moving on or near the ground. The problem of noise in the surrounding atmosphere created by this type engine is eliminated or substantially reduced by the sound suppressing means illustrated and described. Thus it is possible to construct the transportation system of this invention with a relatively low investment cost and achieve better economy through the use of known high-powered reaction-type engines.

It is to be noted that the use of jet engines causes combustion in the volumes of the tubes 146 and 158. This combustion creates combustion byproducts and contaminates in the air in the tube that could conceivably, when injected into the atmosphere, create a slight air pollution. To prevent or reduce this occurance, combustion contaminate removal material such as charcoal 148 and 160 is provided in the inner volumes of the tubes 146 and 158 as well as in the chimney 162 to reduce as much as possible the passage of combustion contaminates to the outer atmosphere.

While I have shown and described specific preferred and modified forms of my invention, it is to be understood that various changes and modifications may be made without departing from the spirit of the invention as set forth in the appended claims.

I claim:

1. A ground-oriented vehicle that rides on a road bed comprising:
   means for supporting the vehicle on a road bed;
   jet propulsion means for propelling the vehicle;
   at least one tube positioned parallel with said road bed and having a longitudinal slot for containing said propulsion means; and
   support means projecting through said slot for securing said propulsion means to said vehicle.

2. A ground-oriented vehicle as claimed in claim 1 in which said slot having sound suppressing means for restricting the passage of sound waves through said slot.

3. A ground-oriented vehicle as claimed in claim 2 in which:
   said slot has opposing sides;
   said sound suppressing means comprising a plurality of opposing channels in said sides; and
   said channels being parallel with said tube.

4. A ground-oriented vehicle as claimed in claim 2 in which:
   said slot has opposing sides;
   said sound suppressing means comprising a plurality of spaced vanes secured to each side of said slot and extending in a direction across said slot and slanted toward the volume of said tube; and
   said support means comprising a strut that passes between the ends of said vanes.

5. A ground-oriented vehicle as claimed in claim 1 in which:
   said road bed has a horizontal flat surface and upwardly projecting longitudinal side surfaces; and
   said support means comprising air source means for injecting volumes of air under pressure between the lower and side surfaces of said vehicle and the horizontal and upwardly projecting surfaces of said road bed, thereby supporting said vehicle on a cushion of air.

6. A ground-oriented vehicle as claimed in claim 5 in which:
   said tube is positioned below said horizontal surface with said slot opening in said surface; and
   said support means comprising at least one strut that projects through said slot.

7. A ground-oriented vehicle as claimed in claim 1 in which:
   said road bed has a raised center portion and longitudinal flat horizontal surfaces on each side thereof;
   each of said horizontal surfaces having an outer upwardly projecting longitudinal side member with an inwardly projecting shoulder on its upper edge forming a side channel;
   said vehicle having a lower surface and side portions that fit over said raised center portion and into said channels; and
   said support means comprising air source means for injecting volumes of air under pressure between the lower and side surfaces of said vehicle and the upwardly and inwardly facing surfaces of said horizontal surfaces and said side channels, thereby supporting and positioning said vehicle on a cushion of air.

8. A ground-oriented vehicle as claimed in claim 7 in which:
   said tube is positioned below said raised center portion with said slot opening in the upper surface of said raised center portion; and
   said support means comprising at least one strut that projects through said slot.

9. A ground-oriented vehicle as claimed in claim 1 in which:
   said road bed has a rail supported thereon;
   said supporting means comprising rotatable wheels secured to said vehicle for rolling against the top and side surfaces of said rail;
   tubes being positioned along each side of said rails with longitudinal slots opening toward said rail; and
   said support means comprising struts projecting from each side of said vehicle and extending through said slots with the ends being secured to propulsion means.

10. A ground-oriented vehicle as claimed in claim 9 in which said vehicle has means for spraying an oil film between said wheels and said track.

11. A ground-oriented vehicle as claimed in claim 1 in which said tube has material on the inner surface for removing fuel combustion contaminates in the air in said tube.

12. A ground-oriented vehicle as claimed in claim 1 in which the inner surface of said tube and slot being coated with a radiation shielding material.

13. A ground-oriented vehicle as claimed in claim 1 including second means for providing air circulation between the volume of said tube and the atmosphere.